June 30, 1931.   E. V. BARKER   1,812,075
COMBINED BUMPER AND TRUNK CARRIER
Filed Nov. 26, 1930   2 Sheets-Sheet 1
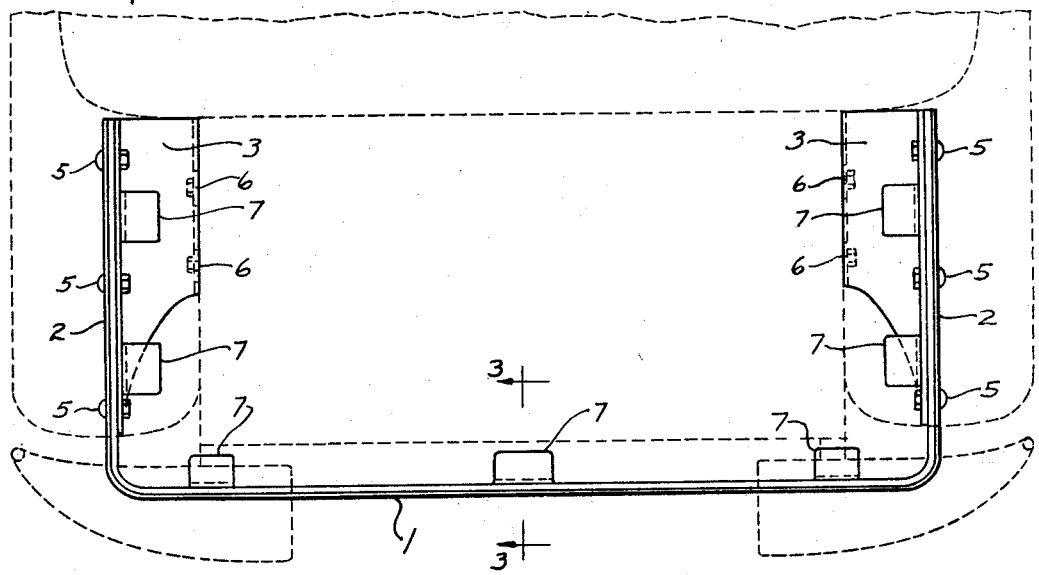
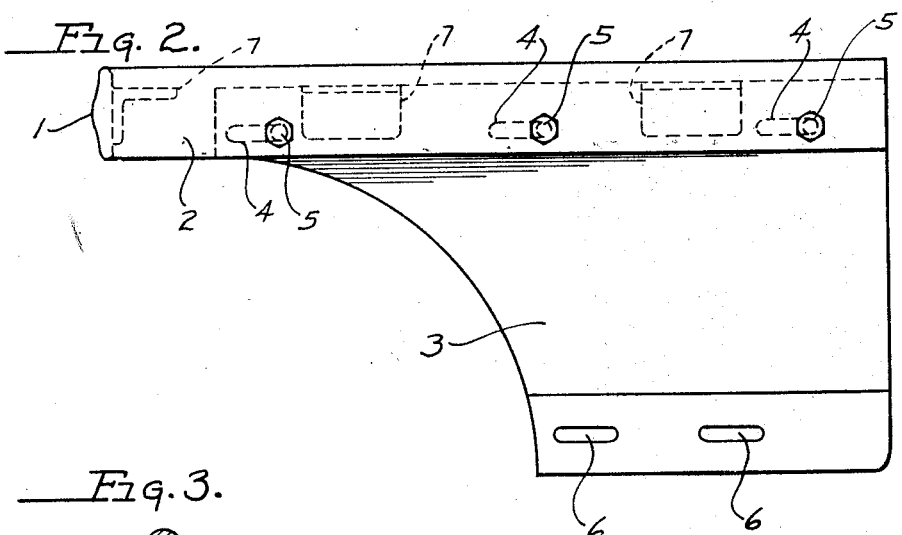
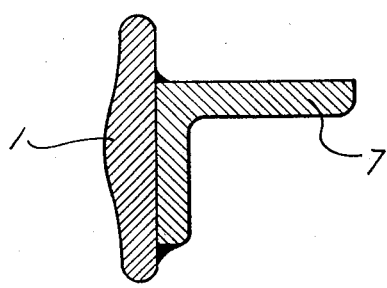
INVENTOR
EROS V. BARKER.
BY
ATTORNEY June 30, 1931. E. V. BARKER 1,812,075
COMBINED BUMPER AND TRUNK CARRIER
Filed Nov. 26, 1930  2 Sheets-Sheet 2
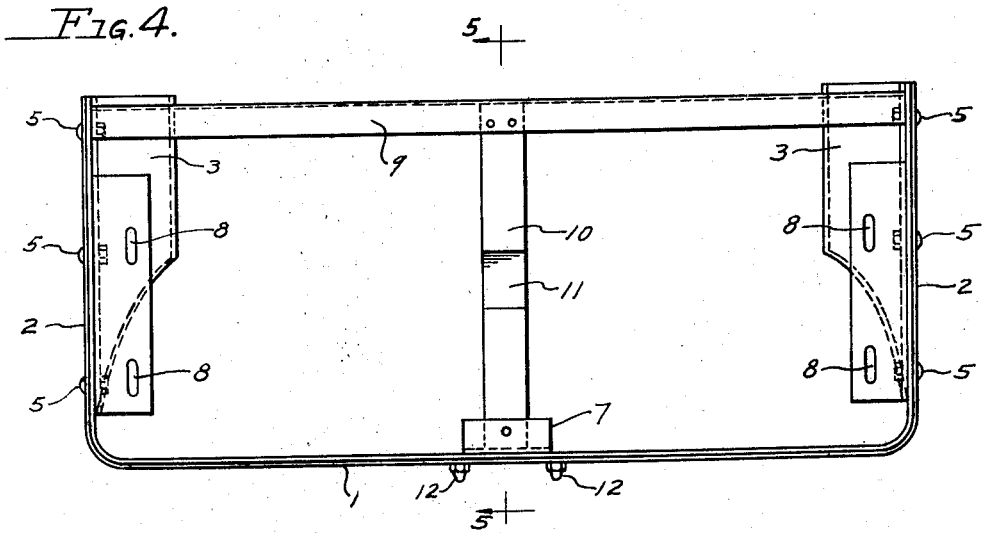
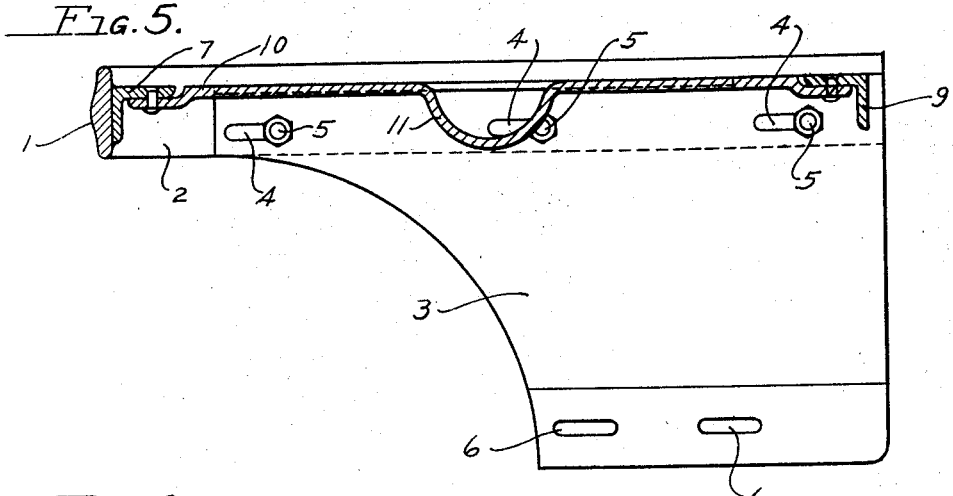
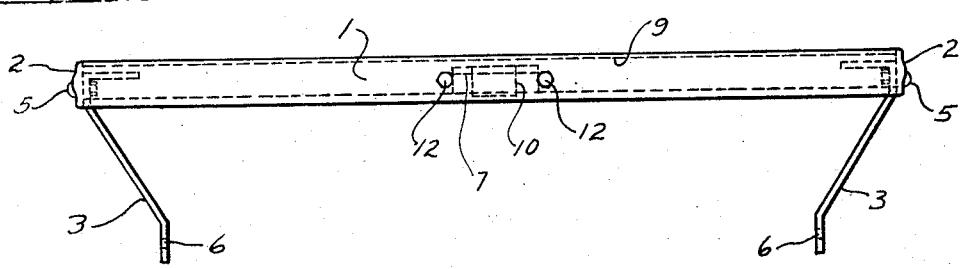
INVENTOR
EROS V. BARKER.
Toulmin & Toulmin
ATTORNEY Patented June 30, 1931

1,812,075

UNITED STATES PATENT OFFICE

EROS V. BARKER, OF BELLEVUE, OHIO, ASSIGNOR TO THE BELLEVUE MFG. COMPANY, OF BELLEVUE, OHIO, A CORPORATION OF OHIO

COMBINED BUMPER AND TRUNK CARRIER

Application filed November 26, 1930. Serial No. 498,325.

This invention relates to improvements in an article of manufacture comprising a trunk carrier and rear bumper consisting of a frame formed of suitable material adapted to be attached to the frame or chassis of an automobile, for supporting a trunk on the rear thereof and for protecting the trunk thus supported.

It is also an object of this invention to provide a trunk carrier on which the trunk is supported with its bottom below the upper edge of the carrier, in such a manner that no open space will appear between the outer wall of the trunk and the carrier.

It is also an object of this invention to provide a trunk carrier and bumper adapted to protect the rear fenders, and for this purpose the carrier may extend substantially to the outer edges of the rear fenders.

It is also an object of this invention to provide, in connection with a trunk carrier and bumper, means for adjustably supporting the carrier on some part of the frame or chassis. The carrier may be attached directly to the frame or it may be attached to the frame by means of suitable plates having slots therein, by means of which the plates may be adjustably positioned on the trunk carrier and may be adjustably attached to the frame of an automobile.

It is a further object of this invention to provide, in connection with a trunk carrier and rear bumper, a reenforcing bar adapted to resiliently protect the central part of the cross bar forming part of the carrier frame.

It is an object to provide a combined bumper and trunk support that can be mounted to take different size trunks, without disturbing existing bumperettes.

These and other advantages will appear from the following description taken in connection with the accompanying drawings.

Referring to the drawings:

Figure 1 is a top plan view of the trunk carrier showing a section of the chassis and a part of the fender.

Figure 2 is a side elevation showing the bar in connection with an attaching plate.

Figure 3 is a section through the bar constituting the frame of the trunk carrier, showing a trunk supporting bracket and the manner in which the brackets are welded to the bar.

Figure 4 is a top plan view of a modified form of trunk carrier.

Figure 5 is a section through the trunk carrier frame showing the brace bar.

Figure 6 is a rear elevation of the form shown in Figure 4.

This invention relates to an attachment for use as a trunk carrier and rear bumper, and is preferably formed essentially of one piece of bar steel bent to form a rectangular U-shaped frame having a transverse member 1, and two forwardly extending projections 2, one at each end of the transverse bar 1. The ends of the forwardly extending projections have holes or slots therein for the purpose of attaching the frame to some part of an automobile chassis. This frame may be attached directly to the chassis of an automobile or it may be attached thereto by means of attaching plates 3, one for each of the forwardly extending projections.

Each of these plates has slots or holes 4 therein by means of which they may be attached to the projections. These plates also have other holes and slots 6 by which they may be attached to the chassis of an automobile. These plates are attached to these projections by means of bolts 5.

The U-shaped frame has attached thereto trunk brackets 7. These brackets may be attached to the frame in any suitable manner, but in the present instance they are attached thereto by welding and are located below the upper surface of the frame so that when the trunk is placed upon the brackets the space between the trunk and the brackets is concealed because of the frame extending above the brackets. Each of these brackets has holes 8 for attaching the trunk to the bracket.

The outer periphery of the bar constituting the trunk carrier frame may be formed in different configurations so that an ornamental and attractive appearance may be effected. In the present instance there is a longitudinal bead extending from one end of the bar to the other along the center of the bar. On each side of this longitudinal bead there is a slight depression, giving the outer periphery of the bar a wavy appearance. When this bar is highly polished it will, in connection with the trunk supported thereon, give an ornamental effect to the rear of the car.

The frame in the example shown is composed of one piece formed into a transverse bumper bar and forwardly projecting extensions by properly bending the bar. The bend is gentle and gradual so that the point where the forwardly projecting extensions meet the transverse bar is round and smooth and has an ornamental appearance. While the frame is thus shown as composed of a single bar of suitable material the transverse bar may be connected to the forwardly extending projections by some other suitable means. The plates not only serve as means by which the frame may be attached to the chassis of an automobile but they may serve as protectors for the under part of the trunk.

In the event that the trunk is removed a cover may be fitted within the frame and on the supporting brackets, thus converting the entire rack into an ornamental deck for carrying miscellaneous luggage. In Figure 4 a modified form of rack is shown. In this form there is a brace bar 10 attached at one end to one of the trunk brackets and at the other end to a cross bar 9. The ends of this cross bar are suitably attached to the front ends of the forwardly extending projections. The ends of the brace bar are attached one to one of the trunk brackets by means of a bolt and the other to the cross bar by means of one or more bolts.

This brace bar has in the center thereof a downwardly extending loop 11 to give the bar longitudinal resiliency so that whenever an impact is produced upon the carrier frame this impact is transmitted to the brace bar, but is destroyed by means of the resiliency in the loop 11. The form of trunk carrier as shown in Figure 4 is supported in the same manner that the form shown in Figures 1, 2 and 3 is. There may be also provided, in connection with the trunk carrier, means 12 for supporting a spare tire on the rear of the carrier frame.

I desire to comprehend within my invention such modifications as may be embraced within my claims and the scope of my invention.

Having thus fully described my invention, what I claim is new and desire to secure by Letters Patent, is:

1. A new article of manufacture comprising a frame member which performs the double office of a trunk carrier and a yielding protecting bumper, said frame member having trunk brackets thereon below the upper surface thereof.

2. A new article of manufacture comprising a trunk carrier and a bumper formed of a rear transverse bar and forwardly projecting extensions, each extension having thereon a broad attaching plate attached at one edge to the extension and at an opposite edge to the chassis of an automobile to support the article upon the chassis of an automobile.

3. A new article of manufacture constituting a trunk carrier and bumper formed of a rear transverse bar, forwardly projecting supporting members, and forwardly extending shock-absorbing means.

4. A new article of manufacture constituting a trunk carrier and bumper formed of a rear transverse bar, forwardly projecting supporting members, and a forwardly extending shock-absorbing bar.

5. A new article of manufacture constituting a trunk carrier and bumper formed of a rear transverse bar, forwardly projecting supporting members, and a forwardly extending looped shock-absorbing bar.

6. A new article of manufacture constituting a trunk carrier and bumper formed of a U-shaped bar having at each end an adjustable supporting plate, and intermediate its ends a plurality of trunk-supporting brackets.

7. A new article of manufacture constituting a trunk carrier and bumper formed of a U-shaped bar having thereon a plurality of trunk-supporting brackets.

8. A new article of manufacture constituting a trunk carrier and bumper formed of a U-shaped bar having welded therebeneath its upper edge a plurality of trunk-supporting brackets.

9. A new article of manufacture constituting a trunk carrier and bumper formed of a U-shaped bar, and an intermediate shock-absorbing member.

10. A new article of manufacture constituting a trunk carrier and bumper formed of a U-shaped bar having a transverse bar at the ends thereof, and an intermediate shock-absorbing means.

11. A new article of manufacture constituting a trunk carrier and bumper formed of a U-shaped bar having a transverse bar at the ends thereof, and an intermediate resilient shock-absorbing bar attached at one end to the U-shaped bar and at its other end to the transverse bar.

12. A new article of manufacture constituting a trunk carrier and bumper formed of a U-shaped bar, a transverse bar attached at its ends to the ends of the U-shaped bar, and a looped shock-absorbing bar attached at one end to the U-shaped bar and at its other end to the transverse bar.

13. A new article of manufacture constituting a trunk carrier and bumper formed of a rectangular frame having inwardly extending trunk-supporting brackets, and a longitudinally disposed looped shock-absorbing bar.

In testimony whereof, I affix my signature.

EROS V. BARKER.